March 21, 1933. A. MUSSO 1,902,089
PROCESS OF MINERAL REDUCTION AND METAL EXTRACTION
Filed July 25, 1927
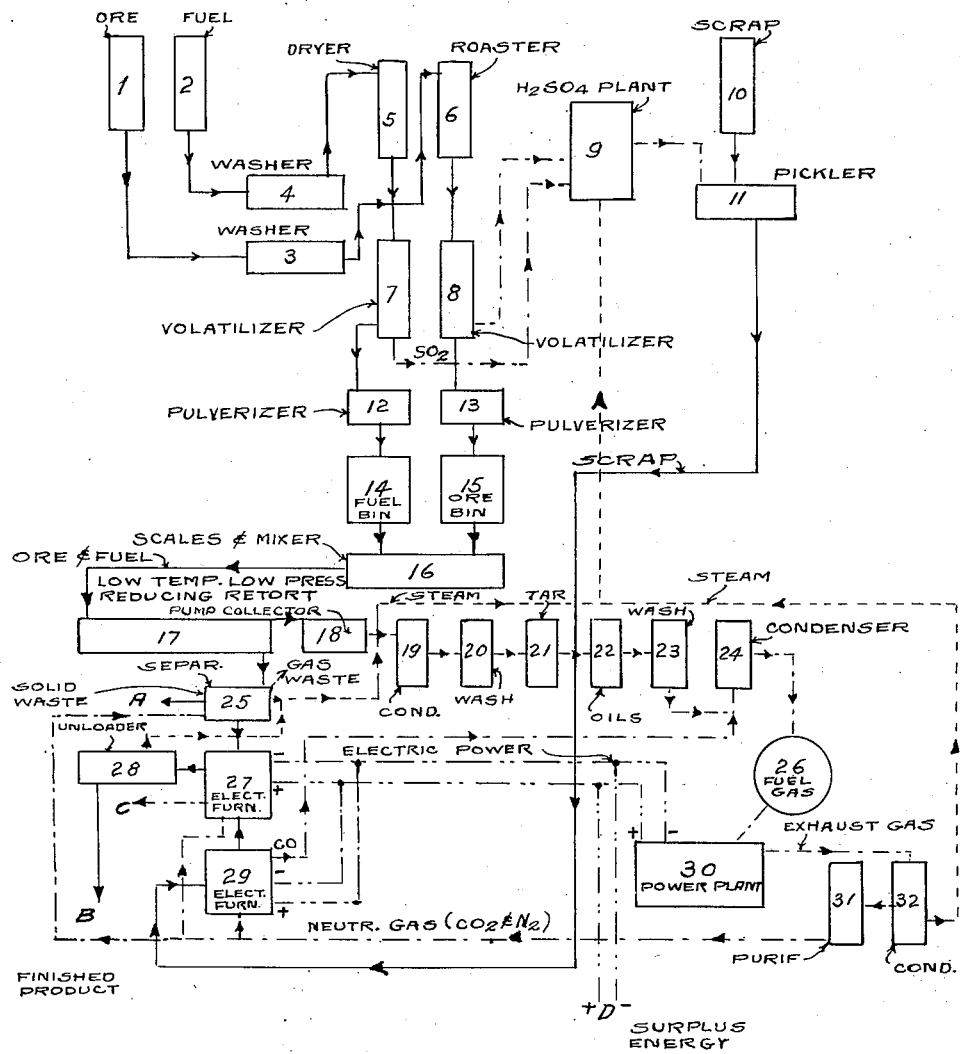

Patented Mar. 21, 1933

1,902,089

UNITED STATES PATENT OFFICE

ALFRED MUSSO, OF EAST ORANGE, NEW JERSEY, ASSIGNOR OF ONE-HALF TO WILLIAM P. DEPPE, OF NEW YORK, N. Y.

PROCESS OF MINERAL REDUCTION AND METAL EXTRACTION

Application filed July 25, 1927. Serial No. 208,103.

This invention relates to a process of mineral reduction and metal extraction.

One object of this invention is to provide an improved process for the indirect extraction of a metal from a mineral to form steel or alloys, wherein refuse or by-product portions of the mineral and the reducing agent are removed partly as gases and partly by mechanical separation, and the purity of the metal maintained throughout.

A further object of this invention is to provide a process for extracting a pure metal from a mineral comprising essentially two steps, namely, an efficient and improved reduction of the mineral at a comparatively low temperature accompanied by a withdrawal of gases as generated, and a mechanical separation of the metal from the mineral so reduced.

A further object of this invention is to provide an improved indirect process for the extraction of a metal from a mineral wherein said mineral is mixed with a solid fuel, this process having in view the rapid removal of volatile constituents of the mineral and fuel and the gaseous products of the reduction, a reduction of the mineral by means of the fixed carbon of the fuel, as for instance in a retort, without incipient fusion, a mechanical separation of the metal from the gangue, and finally, if desired, treatment in a furnace, preferably of the electric type, to make any required metal, alloy, or grade of iron or steel.

A further object of this invention is to provide a direct process for the reduction of a mineral, which process is operative at a comparatively low temperature, preferably between a minimum temperature of 700° C. for coking coals and a maximum temperature of 950° C. for non-coking coals, with an approved condition of the retort atmosphere resulting in the production of a gaseous fuel of high calorific value, and whereby pure and high grade metals can be obtained in an inexpensive and simplified manner.

A further object of the invention is to provide a process of the character described, wherein the reduction of the mineral, and other heat treating operations contemplated by the invention, occur out of contact with air and preferably in a neutral atmosphere.

A further object of this invention is to provide a process of the character described, wherein a metal is extracted from its ore without the use of fluxing agents.

A further object of the invention is to provide a process of the character described, wherein hydrocarbon and other gases are removed from the furnace atmosphere, as for instance in the reduction furnace, to prevent secondary reaction of said gases with the metal or other substances present, and otherwise simplify the extraction in pure form of said metal from the mineral, with the production of a fuel gas of sufficient calorific value to render the process self contained.

Further objects of this invention reside in the provision of a novel continuous process having the various features hereinafter described making for higher efficiency and economy, and contemplating for instance, the complete utilization of fuel, the use of a recuperative reduction furnace, the manufacture of an acid, as for instance, sulphuric acid, and use thereof for cleaning the scrap metal, the utilization of steam obtained at various steps in the process for making the sulphuric acid, the removal of by-products and extraction of fuel therefrom for use in the power plant for said process, the removal of carbon dioxide where generated for use as neutral atmosphere as may be necessary, the use of automatic temperature control, all of which features are incorporated into an improved process that is comparatively self-contained.

A novel feature of the process is the simultaneous carbonization of the coal and reduction of the ore in the same chamber in their finely divided intermixed condition, while simultaneously producing nascent amorphous carbon, high B. t. u. fuel gases from volatiles liberated in heating coal, and also simultaneously producing CO and practically no $CO_2$ from carbon in coal and oxygen in the ores with substantially pure metal. The reactions named occur at temperatures held below the melting or fusing points of the solid materials being treated. All of this is accompanied by a simultaneous rapid withdrawal of the gases as fast as formed. It will be noted that the defined rapid withdrawal of gases occurs by means of a force externally to and other than gaseous pressure of the carbonizing-reduction system, i. e., forced removal, so that the withdrawal of gases may be as fast as generated, for example, at or below the emanation pressure of the gases. In the experimental and development work, sufficient bituminous coal was mixed with various ores to give excess carbon over the amount required for complete utilization of oxygen in ores, to prevent formation of carbon dioxide, and pumps were used to rapidly withdraw all gases as fast as formed, to maintain a reduced pressure in the closed reduction chamber, and permit reduction at lowered temperatures. Under these conditions a nascent amorphous carbon of highest chemical activity is produced in an accelerated degree, and substantially completely reduces the ores with a high degree of rapidity with the production of maximum amounts of carbon monoxide. The carbonization may be advantageously produced even in low grade coals such as lignites. This process is applicable to any ores substantially reducible by nascent amorphous carbon under conditions described. Some reduction takes place at all pressures, although the reduction is most rapid and more complete at the lower pressures.

Other objects will in part be evident and in part pointed out hereinafter.

It is intended that the process, and the terms referred to herein be broadly construed. The words minerals and fuels are accordingly to be understood as including all materials which are particularly susceptible of use according to this peculiar process. The expression rapidly withdrawing the gases from the retort as quickly as they are generated, presupposes that the resulting pressure in the retort will be lowered to any desired extent than that which could otherwise obtain therein.

Among the minerals in the reduction of which I am primarily interested, may be mentioned the oxides and carbonates of iron. But the minerals of metals other than iron may also be reduced. The fuels contemplated herein are preferably natural fuels, such as coals or similar carbonaceous material, but the fuels may also have been artificially treated and lignites may be employed for the actual reduction of the mineral. By the use of a natural fuel, i. e., coal, however, a self contained process, comprising a complete cycle of operations is realized, since the fuel gas generated suffices to supply the power for operating the plant in all its phases to produce steel as the final product.

Accordingly the process described herein constitutes one possible embodiment of the invention, the scope whereof is indicated in the following claims.

The drawing illustrates schematically the steps of the process and the apparatus employed. Any suitable apparatus or plant layout may be used and the process is not limited thereby in scope or application.

In the direct process for the reduction of a mineral and the extraction of the metal at present known, only impure metals such as a comparatively low grade of iron sponge can be obtained. By this process, however, a pure metal that can be made into steel or alloys is extracted. This results from the rapid removal of the volatile substances in the reduction furnace, and the use of neutral atmosphere to prevent oxidation in heat treating operations to produce steel and alloys from the substantially pure iron. The treatment of the coal in the retort results in the production of an amorphous carbon of high chemical activity.

While iron and alloys thereof may be referred to hereinafter as the metal, it will be understood that this process is applicable to the extraction of any metal, such for instance, as nickel.

1 denotes an ore supply, and 2 a fuel supply, from which mineral and fuel are passed through washers 3 and 4. The fuel is then dried in 5, while the mineral is roasted in 6, after which the fuel and mineral are passed into the volatilizers 7 and 8. Among the substances extracted in the volatilizers 7 and 8 is phosphorus and sulphurous anhydride, the latter being discharged into 9 where it is made into sulphuric acid to be used in the process, as will be described hereinafter.

From the volatilizers 7 and 8, the fuel and mineral are passed through pulverizers 12 and 13, thence into bins 14 and 15, and then into a mixer 16, from which the finely divided and thoroughly mixed mineral and fuel are discharged into a heating chamber or a reduction furnace 17.

The fuel and mineral may be calculated after analysis to be in approximately correct proportions, but a slight excess of carbon may be provided for.

The reduction furnace 17 is preferably of a retort type to cause the chemical actions to occur in a furnace atmosphere free from air. Said furnace is also of any recuperative type, well known in the art, so that a high furnace efficiency can be obtained. In this furnace the charge is externally heated in any suitable manner, as distinguished from internal heating such as by electrical currents passing through a charge.

The temperature in the reduction furnace 17 is at about 700° C. as a minimum when the fuel used is a coking coal, and 950° C. as a maximum when the fuel is a non-coking coal, or other suitable comparatively low temperature which is insufficient to melt the mineral or ash or to cause any substantial agglomeration or sticking together of particles, but will cause reduction of the metal by the fixed carbon of the coal. The temperatures specified are intended to be merely illustrative and may vary with the materials used, the speed of the reduction, and other factors. Mechanical separation is then used as will be described hereinafter and naturally requires a nonagglomerated mass in order to properly separate the metal from said mass as it comes from the retort.

In the reduction furnace 17 hydrocarbon gases and other gaseous constituents including those resulting from reduction, are exhausted, preferably as quickly as they are generated, so as not to react with the metal or other material present in the furnace and to permit pure metal to be obtained by subsequent mechanical separation. The gases thus withdrawn will have a high percentage of hydrocarbons and carbon monoxide. Said gases may be stored in a gas collector 18 from which they are passed into a primary condenser 19, thence into a washer 20 to extract the gases, and the residuum into a tar collector 21, an oils extractor 22, a final washer 23, and a final condenser 24. Then the gases, which have a very high heating value, are stored in a tank 26. These gases constitute the fuel for an electric power plant 30 which is used in the process as will be described hereinafter.

At any of the retort temperatures referred to moisture, sulphur, coal gases, hydrocarbon gases produced from volatile matter and vaporizing tars, etc., from the carbonaceous fuels, will be liberated and exhausted, preventing sintering, oxidizing, or fusing of materials, and producing substantially pure metals.

From the retort furnace 17, the solid residuum is passed to a mechanical separator 25 to separate the metal from the gangue and refuse. Accordingly no flux is used in this process. Said mechanical separator may be of any suitable type, and comprises for instance, a pulverizer, cooler for the metal and a magnetic separator.

A neutral gas, preferably carbon dioxide or an equivalent gas, may be discharged into the separator 25 to prevent any possible entrance of air into said separator. Said neutral gas may be obtained from the exhaust gases of the power plant 30, said exhaust gases being first passed through a washing condenser 32 and a purifier and dryer 31, or otherwise suitably treated to supply a pure carbon dioxide. From 32, and the separator, water vapor or steam may flow to the chamber 9 to react with a sulphuric anhydride to make sulphuric acid. The solid refuse, designated at A, is removed from the mechanical separator and plays no further part in the process.

The metal thus mechanically separated and purified is fed into any suitable type of melting furnace, such as an electric furnace 27 which melts the metallic powder. Into the melt are placed any suitable ingredients necessary to produce a carbon steel, or an alloy steel. The melting may occur in any suitable neutral atmosphere, neutral gas being discharged into said furnace from 31. The finished product designated by B is then discharged into an unloader 28, from which water vapor resulting from the water that is used for cooling the product may be passed into chamber 9. Exhaust gases are denoted by C.

10 denotes a scrap material supply, from which scrap material is fed into a cleaner 11 to be washed by sulphuric acid drawn from 9. The cleansed scrap material is then placed into a secondary electric furnace 29 wherein it is melted. A neutral atmosphere is likewise maintained in the secondary electric furnace, and preferably carbon dioxide from 31 is used. Said carbon dioxide may act as a reducing agent for the scrap iron to reduce the carbide of iron, and is itself reduced to carbon monoxide, a reaction well known in the art. It is cooled in condenser 24 and collected in 26.

The comparatively pure iron of secondary furnace 29 is then fed into the primary furnace 27 where it is treated to form a carbon or alloy steel, as stated hereinbefore.

The furnaces 27 and 29 have electrodes designated by the plus and minus signs, and connected to the power plant 30. It is thus seen that gases generated in the process are used to create power to operate said furnaces. Any excess of electrical power may be tapped at D. The exhaust gases of said power plant furnish the carbon dioxide or other gas for a neutral atmosphere for a furnace, condenser or wherever it is desired to prevent oxidation of the metal. The process is thus seen to be continuous and self-contained.

For maximum efficiency and uniformity of the product, the temperature in the reduction furnace and at such other points in the process as may be desired is controlled by any automatic temperature control well known in the art.

While the ores of various metals may be reduced by the process, the following ores and their basic reactions are suggested as being typical, without, however, limiting the invention to any of these ores or the group thereof.

(1) Hematite reduction:
$$Fe_2O_3 + 3C = 2Fe + 3CO \uparrow$$
(2) Magnetite reduction:
$$Fe_3O_4 + 4C = 3Fe + 4CO \uparrow$$
(3) Siderite or carbonate of iron:
$$FeCO_3 + 2C = Fe + 3CO \uparrow$$
(4) Limonite or hydrated oxide of iron or brown ore: $2Fe_2O_3 \cdot 3H_2O$;
$$2Fe_2O_3 + 3H_2O + Heat = 2Fe_2O_3 + Steam \uparrow$$
$$Fe_2O_3 + 3C = 2Fe + 3CO \uparrow$$
(5) Roasted carbonate ore:
$$FeO + C = Fe + CO \uparrow$$
(6) $Fe_2O_3 \cdot H_2O$;
$$Fe_2O_3 + H_2O + Heat = Fe_2O_3 + Steam \uparrow$$
$$Fe_2O_3 + 3C = 2Fe + 3CO \uparrow$$

Conditions in the process will vary somewhat with the ingredients of the charge, as for example, the quantity of moisture and sulphur of the ore, which may be taken care of by methods well known in the art. Thus in Equations 4 and 6, the ore may be preheated outside of the retort to drive off excessive moisture, or moisture may be driven off directly in the retort.

The ores or the group thereof susceptible to the process may be further defined as being reducible by solid carbon of a carbonaceous substance such as coal below fusion temperature of the materials in the charge; the knowledge of the art is indicated as also being a definite factor. The art had previously attempted the low temperature reduction of ores of metals, particularly of iron, without fusion, the reduction, such as it was, occurring wholly by means of gases, or partly by gases and partly by solid carbon. By this invention the step of rapidly constantly exhausting the gases at the reduction, was added, creating as a consequence, new physical conditions and a new chemical activity. It may be mentioned that secondary reactions are prevented, the ambient pressure is reduced, a lower temperature for the reduction is available, without possibility of melting of the materials of the charge, so that a wider range of materials, both fuels and ores may be used, with less upkeep for the retort, the exhaustion of the gases preventing a blanketing action of the gases on the charge, or the production of equilibrium conditions which retard or stop a desired reaction, the lower ambient pressure aiding in the evolution of oxygen from the ore, and permitting the natural affinity of the nascent carbon therefor to cause combination, and the production by the exhaustion of sufficient fuel gases unusually rich in carbon monoxide to render the process self sustaining, and finally, a practically pure sponge iron is obtained from which a steel can be made which is 40% to 50% stronger than that made from pig iron.

I claim:

1. A low temperature ore reduction process for producing substantially pure metal, and separating the same in finely divided condition from the gangue before melting, which includes externally heating, in finely divided intermixed condition in a closed retort, a coal and an ore of the group including the oxides, hydroxides, and carbonates of iron, at a temperature approximately between 700° C. as a minimum for coking coals and 950° C. as a maximum for noncoking coals, to avoid fusion, sintering, and agglomeration in the charge, while excluding air from the retort and simultaneously continuously forcibly removing by pump means during the reduction in said retort all gases produced therein, to the degree that substantially no carbon dioxide is obtained, whereby the reduction is caused to be accomplished substantially entirely by the nascent amorphous carbon of the coal, developed in the retort.

2. A low temperature accelerated ore reduction process according to which substantially pure metal is produced without a flux and separated in finely divided form from the gangue before melting, said process including externally heating a solid fuel capable of producing nascent amorphous carbon in a closed heated reducing retort, and an ore containing the oxides, hydroxides, or carbonates of metal capable of being reduced by solid carbon reaction below the melting points of solids in charge, in finely divided intermixed condition, out of contact with air and extraneous gases, at a temperature within the range of approximately 700° C. to 950° C., said heating being externally accomplished at a temperature in the retort such as to avoid any fusion of particles of the charge, while simultaneously so rapidly positively withdrawing by suction means all gases produced that substantially no carbon dioxide is obtained, whereby gaseous reduction and secondary reactions of the gases are avoided, and the reduction substantially completed by the nascent amorphous carbon produced in the reaction chamber.

3. A low temperature ore reduction process wherein a substantially pure metal is produced and separated from the gangue before melting, characterized by intermixing finely divided coal and an ore of the group including the oxides, hydroxides or carbonates of iron, externally heating the mixture to a temperature high enough to produce nascent amorphous carbon and to cause reduction of the ore, but not substantially in excess of 950° C., in a closed chamber, while excluding extraneous gases and continuously forcibly exhausting all gases with pump means from the chamber substantially as fast as generated and at pressure not in excess of atmospheric, the forced exhaustion being sufficient to cause the reduction to occur in an accelerated manner substantially entirely by means of the nascent amorphous carbon of the coal produced, and the temperature being sufficiently low so that the charge is maintained with the particles thereof in such finely divided condition that the metal can be mechanically separated from the gangue.

4. A low temperature process of reducing in a closed chamber an ore with a fuel in finely divided, intermixed condition and separating the metal from the gangue before melting, said process including the utilization of a fuel capable of producing nascent amorphous carbon in retort, with an ore of the group including the oxides, hydroxides, and carbonates of metal, externally heating the charge to a temperature within the approximate range of 700° C. to 950° C., and forcibly removing, from the chamber, by suction means substantially as fast as formed, all gases therein, including carbon monoxide and the hydrocarbons of the fuel, so that the reduction occurs substantially entirely by means of nascent amorphous carbon of the fuel without fusion of solids in charge and substantially without production of carbon dioxide.

5. A continuous low temperature process of reducing an ore with a solid fuel in finely divided intermixed condition without using a flux, out of contact with air, and separating the metal from the gangue before melting, which includes externally heating a finely divided mixture of coal, and an ore of the group including the oxides, hydroxides, and carbonates of iron at a temperature not in excess of 950° C., without fusion in the solids of the charge, and withdrawing from the locus of reduction the gases produced including the hydrocarbons of the coal and the carbon monoxide, at a pressure below atmospheric.

6. A process of reducing with coal an ore of the group including the oxides, hydroxides and carbonates of metal in finely divided intermixed conditions, in a substantially airtight chamber, which includes externally heating the mixture to a temperature within the range of 700° C. to 950° C. to cause simultaneous carbonization of the fuel and reduction of the ore to liberate volatile matter and produce carbon monoxide, while forcibly removing from the reduction ambient all the gases developed at a pressure below atmospheric, so that the ore reduction occurs substantially entirely by the nascent amorphous carbon developed by the carbonization of the fuel in reducing chamber, without fusion of solid materials in the charge and substantially without the production of carbon dioxide.

7. A process as described, of simultaneous coal carbonization and ore reduction in the same closed chamber, which includes mixing in finely divided condition a coal with an ore of the group including the oxides, hydroxides, or carbonates of iron, and simultaneously causing a carbonization of the coal and a reduction of the ore by externally heating the mixture within an approximate range of 700° C. to 950° C., and withdrawing by suction means, during said heating, all gases, including the hydrocarbons and the carbon monoxide produced, within a pressure range from approximately atmospheric to any pressure therebeneath so that the reduction is effected substantially entirely by the solid carbon of the coal, and substantially without the production of carbon dioxide.

8. A continuous low temperature process of reducing an ore with a corbonaceous fuel in finely divided intermixed condition, which includes heating in a closed chamber, a fuel capable of producing nascent amorphous carbon, with an ore capable of being substantially reduced by solid carbon reaction, below melting points of solids in charge, at temperatures to cause carbonization of fuel and reduction of ore by the nascent amorphous carbon produced in reducing chamber, the heating being external of the charge and with maximum temperatures held sufficiently low to avoid incipient fusion of solids in charge, while continuously so withdrawing from the chamber all of the gases produced therein by pump means, at a decreased pressure within the range from approximately atmospheric to any pressure therebeneath to the degree, that the reduction is effected substantially entirely by the fixed carbon of the fuel, separating the finely divided metal from the gangue before melting, treating the substantially pure metal to produce alloys thereof, and utilizing the withdrawn gases for furnishing the heat and energy to render the process self-sustaining.

9. A low temperature ore reduction process, which includes intimately mixing a finely divided fuel capable of producing nascent amorphous carbon in reducing retort, and crushed ore capable of being substantially reduced by solid carbon reaction, below melting points of solids in charge, externally heating the mixture without the presence of air, to a temperature to cause carbonization of the fuel and reduction of the ore, but not high enough to cause melting of solids in charge, while forcibly removing all gases liberated and produced in the chamber with pump means to the degree that the reduction is effected substantially entirely by the nascent amorphous carbon from the fuel, substantially without production of carbon dioxide, separating from the gangue the metal produced before melting, then melting the metal in a neutral atmosphere, and utilizing the gases withdrawn from the reduction chamber to furnish the heat and energy for operating the process and producing said neutral gases.

10. A low temperature ore reduction process for producing substantially pure metal, and separating the same in finely divided condition from the gangue before melting, which includes externally heating, in finely divided intermixed condition in a closed retort, a coal and an ore containing the oxides, hydroxides, and carbonates of iron, at a temperature approximately between 700° C. as a minimum for coking coals and 950° C. as a maximum for non-coking coals, while excluding air from the retort and simultaneously continuously forcibly removing with pump means during the reduction in said retort all gases produced therein at a pressure below atmospheric.

In testimony whereof I affix my signature.

ALFRED MUSSO.